US010344849B2

(12) United States Patent
Cimmino et al.

(10) Patent No.: US 10,344,849 B2
(45) Date of Patent: Jul. 9, 2019

(54) DEVICE FOR INHIBITING SELECTION OF ONE OR MORE OPERATIVE POSITIONS OF A SELECTOR OF AN AUTOMATICALLY OPERATED GEARBOX, FOR EXAMPLE A PARKING POSITION

(71) Applicant: FCA Italy S.p.A., Turin (IT)

(72) Inventors: Francesco Cimmino, Turin (IT); Marco Montaldo, Turin (IT); Francesco Contessa, Turin (IT); Valter Eugenio Maggiora, Turin (IT); Vincenzo Nuara, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/062,652

(22) Filed: Mar. 7, 2016

(65) Prior Publication Data
US 2016/0281841 A1  Sep. 29, 2016

(30) Foreign Application Priority Data
Mar. 23, 2015  (IT) .................... 102015000009576

(51) Int. Cl.
*F16H 59/02* (2006.01)
*F16H 61/18* (2006.01)
(Continued)

(52) U.S. Cl.
CPC ......... *F16H 59/0278* (2013.01); *F16H 59/10* (2013.01); *F16H 61/18* (2013.01);
(Continued)

(58) Field of Classification Search
CPC ......... F16H 2059/026; F16H 2059/048; F16H 2059/0282; F16H 2061/165;
(Continued)

(56) References Cited

U.S. PATENT DOCUMENTS 5,662,001 A * 9/1997 Smale .................... F16H 59/04
74/473.24
5,829,309 A * 11/1998 Wagner .................. F16H 59/10
74/473.1
(Continued)

OTHER PUBLICATIONS

Italian Search Report for Italian Application No. IT UB20150597 dated Nov. 12, 2015, 2 pages.

*Primary Examiner* — Victor L MacArthur
*Assistant Examiner* — Joseph Brown
(74) *Attorney, Agent, or Firm* — RMCK Law Group PLC

(57) ABSTRACT

A selector for an automatically operated gearbox is provided and includes: a casing; a control member mounted within the casing in an oscillating manner around a first axis of rotation, the control member being movable through a plurality of operative positions associated to respective operating conditions of the gearbox; a prevention device of the selection of an undesired operative position of the selector, wherein the prevention device includes a rocker mounted within the casing in a rotatable manner around a second axis of rotation; the rocker being operable in rotation around the second axis of rotation by an actuator member between a resting position and a working position in which it is configured to inhibit the selection of the undesired operative position. The prevention device is configured for enabling, in certain conditions, selection of the undesired operative position even when it is currently inhibited.

9 Claims, 4 Drawing Sheets

(51) Int. Cl.
*F16H 59/10* (2006.01)
*F16H 61/22* (2006.01)
*F16H 61/24* (2006.01)
*F16H 59/04* (2006.01)

(52) U.S. Cl.
CPC ....... *F16H 61/22* (2013.01); *F16H 2059/026* (2013.01); *F16H 2059/0282* (2013.01); *F16H 2059/048* (2013.01); *F16H 2061/185* (2013.01); *F16H 2061/223* (2013.01); *F16H 2061/241* (2013.01); *F16H 2061/245* (2013.01)

(58) Field of Classification Search
CPC ......... F16H 2061/185; F16H 2061/241; F16H 2061/245; F16H 59/00; F16H 59/02; F16H 59/08; F16H 59/10; F16H 59/0278; F16H 61/18; F16H 61/22
USPC .............. 74/473.21, 473.22, 473.23, 473.24, 74/473.26, 473.28
See application file for complete search history.

(56) References Cited

U.S. PATENT DOCUMENTS

| | | | |
|---|---|---|---|
| 6,298,742 B1 | 10/2001 | Ey | |
| 6,446,528 B1 | 9/2002 | Sander et al. | |
| 7,213,483 B2 * | 5/2007 | Inoguchi | F16H 59/10 74/473.21 |
| 7,549,353 B2 * | 6/2009 | Shimizu | F16H 59/10 74/471 XY |
| 7,568,404 B2 * | 8/2009 | Grossman | F16H 59/0204 74/473.21 |
| 7,779,715 B2 * | 8/2010 | Mitteer | F16H 61/22 74/473.22 |
| 8,117,938 B2 * | 2/2012 | Mitteer | F16H 61/22 74/473.22 |
| 8,978,504 B2 * | 3/2015 | Morimura | F16H 61/22 74/473.21 |
| 2004/0069088 A1 | 4/2004 | Meyer | |
| 2004/0079613 A1 | 4/2004 | Cho | |
| 2004/0244524 A1 * | 12/2004 | Russell | F16H 59/10 74/473.23 |

* cited by examiner

DEVICE FOR INHIBITING SELECTION OF ONE OR MORE OPERATIVE POSITIONS OF A SELECTOR OF AN AUTOMATICALLY OPERATED GEARBOX, FOR EXAMPLE A PARKING POSITION

CROSS REFERENCE TO RELATED APPLICATIONS

This application claims priority to Italian Patent Application No. 102015000009576 filed on Mar. 23, 2015, the entire disclosure of which is incorporated herein by reference.

FIELD OF THE INVENTION

The present invention relates to a selector for an automatically operated gearbox, the selector including:
a casing;
a control member mounted within said casing in an oscillating manner around a first axis of rotation, the control member being movable through a plurality of operative positions associated to respective operating conditions of the gearbox; and
a prevention device for preventing selection of an undesired operative position of said selector;
wherein the prevention device includes a rocker mounted within said casing in a rotatable manner about a second axis of rotation, said rocker being operable in rotation around said second axis of rotation by means of an actuator member, between a resting position and a working position, in said working position it being configured for inhibiting selection of said undesired operative position.

PRIOR ART AND GENERAL TECHNICAL PROBLEM

Automatic gearboxes can be controlled by the user via a selector that generally includes a lever control member mounted in an oscillating manner within a casing of the selector itself, in such a way that the control member is movable through a plurality of operative positions associated to respective operating conditions of the gearbox. Listed hereinafter are the operative positions common to automatically operated gearboxes, in association with the respective operating conditions of the gearbox:
i) P—parking,
ii) R—reverse,
iii) N—neutral,
iv) D—(forward) drive.

In addition to the positions referred to above, there is in general envisaged at least one further operative position, the synthetic indication of which (for example "S" or else "L") varies according to the manufacturer, and which is generally associated to a particularly low range of transmission ratios for use of the vehicle in conditions of heavy load, or else for managing operation of the gearbox with modalities better suited to sport driving.

With reference in particular to the parking position, selection thereof entails actuation (generally, by means of a Bowden cable) of a mechanism that carries out engagement of a pawl element with a parking gear. The pawl element is generally connected to the gearcase or to a point of the frame not connected in rotation to the kinematic chain downstream of the gearbox, whereas the parking gear is connected in rotation to the wheels of the vehicle, for example via connection to the differential or to the semi-axles.

In order to prevent irreversible damage to the transmission in the event of manoeuvres of misuse by the user, such as an attempt to select the parking position in conditions of forward or reverse drive, the profile of the pawl element and of the teeth of the gear on which it engages is generally designed in such a way as to prevent coupling between the two when the speed of the vehicle is above a safety threshold. Moreover, the transmission members (including the pawl element and the parking gear) are sized so as to withstand the stresses that are generated on account of the inertia of the vehicle when the pawl is engaged on the parking gear at a non-zero speed of the vehicle.

The current design solutions of the parking mechanism inevitably constitute a compromise between having to guarantee low disengagement loads in conditions of steep slope and at full load (in order to prevent undesired situations where it is impossible to release the parking block) and preventing engagement above a certain speed.

Moreover, the profile of the pawl element and of the teeth of the gear must be studied so as to withstand loads and preserve its own geometry also when jolting occurs as a result of an attempt at engaging the parking position when the vehicle is travelling at a speed higher than the safety threshold.

This inevitably leads to a generalized increase in the weight of the vehicle as a consequence of oversizing of the transmission members, and moreover imposes the need to resort to materials and treatments of the entire parking mechanism that are extremely complex and costly.

There are in general known in the field a wide range of devices aimed at preventing selection of an undesired operative position of a selector for an automatically operated gearbox. In the present description, the term "undesired" referred to an operative position of the selector must always be understood in the sense of expressing the danger of selecting the operative position in question in a given driving (or operating) condition of the vehicle.

An example of device for preventing selection of an undesired operative position of a known type includes a rocker element mounted oscillating within the casing of the selector and governed by an actuator member. The actuator member enables displacement of the rocker element between a resting position, where it does not interfere with the movement of the control member of the selector, and a working position, where it is configured for interacting with the control member to prevent displacement thereof into the parking position P or, alternatively, to keep it in the reverse position R. For this purpose, the rocker element has an end shaped substantially like a hook, which is configured for interacting with a locking profile on the control member, which acts as contrast member to prevent selection of the parking position and as gripping member for the hook-like end to prevent exit from the parking position (into the positions R, N, D, etc.).

The actuator member is typically constituted by an electromagnet, the moving element of which governs movement of the rocker element. The resting condition of the electromagnet, equivalent to a condition of absence of electric current passing through the solenoid present therein, corresponds to the working position for the rocker, whereas the resting position of the rocker is associated to a condition of energization of the solenoid, which can be imparted, for example, when the speed of the vehicle drops below the safety threshold (typically 3-5 km/h).

However, the above device presents at least the following types of technical problems:

i) in the event of failure of the electromagnet, the rocker remains in the working position; this means that the driver is prevented from engaging the parking lock with consequent safety problems;

ii) when the selector is shifted rapidly from the position D to the position P with the vehicle running at a speed close to the safety threshold, the times necessary for activation of the electromagnet and response of the entire system prove excessively long to keep up with the speed of the manoeuvre and enable engagement of the parking position;

iii) in given circumstances, it may happen that the driver wishes to select the parking position as manoeuvre for stopping the vehicle in an emergency, possibly at speeds close to or only slightly above the safety threshold; in these circumstances, engagement is rendered impossible by the rocker, which moreover is not even displaced into the resting position if the speed at which the emergency manoeuvre is made is higher than the safety threshold, with consequent problems for safety of the driver and other occupants of the vehicle.

OBJECT OF THE INVENTION

The object of the present invention is to overcome the technical problems mentioned previously.

In particular, the object of the invention is to provide a selector for an automatically operated gearbox, in which the device for preventing selection of an undesired operative position of the selector will enable, in certain conditions, selection of the undesired position even when the selection is currently inhibited.

SUMMARY OF THE INVENTION

The object of the invention is achieved by a selector having the features forming the subject of the following claims, which form an integral part of the technical disclosure herein provided in relation to the invention.

In particular, the object of the invention is achieved by a selector having all the features listed at the beginning of the present description and moreover characterized in that:

said rocker includes a first portion and a second portion, wherein the first portion is connected to the actuator member and wherein in the working position of the rocker the second portion is configured to block said control member upon the occurrence of a selection manoeuvre of said undesired operative position so as to inhibit the selection thereof, and in that the first portion and the second portion are coupled to one another by means of an articulated joint configured to enable a rotation of said second portion relative to said first portion upon exceeding of a predetermined value of an actuation force applied to said control member during said selection manoeuvre of said undesired position, thereby allowing said control member to override the block provided by the second portion, and accordingly enable the selection of said undesired operative position currently inhibited.

BRIEF DESCRIPTION OF THE DRAWINGS

The invention will now be described with reference to the attached drawings, which are provided purely by way of non-limiting example, and wherein.

DETAILED DESCRIPTION

Figure 1:
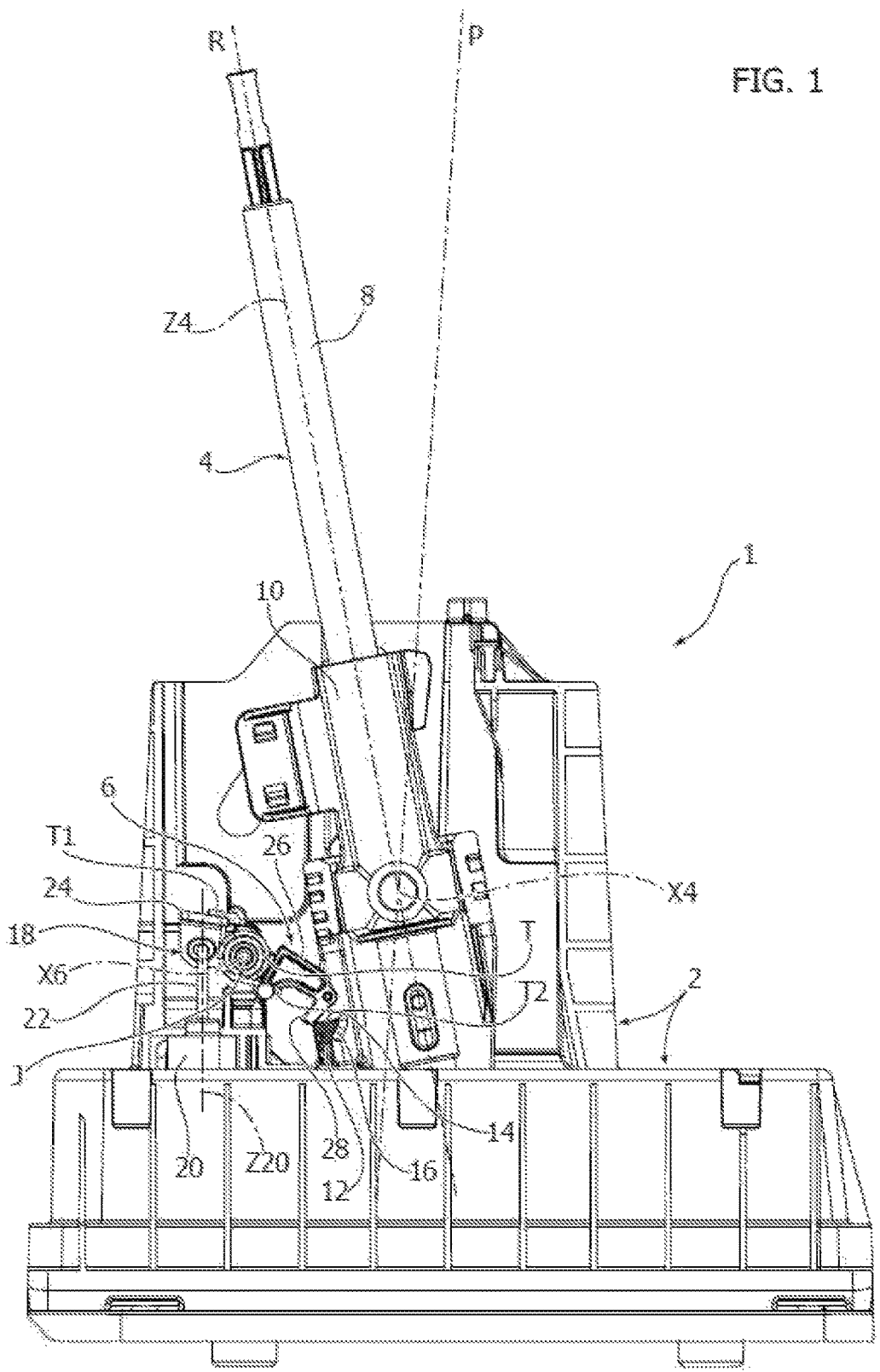
FIG. 1 is a partially sectioned view of a selector according to the present invention in an initial condition of a manoeuvre of selection of an undesired operative position.

With reference to FIG. 1, reference number 1 designates as a whole a selector according to various preferred embodiments of the invention. The selector 1 includes a casing 2 rotatably mounted within which are a control member 4 and a device for preventing engagement of an undesired operative position (referred to hereinafter, for brevity, as "prevention device") designated as a whole by reference number 6. The control member 4 is mounted within the casing 2 so as to oscillate around a first axis of rotation designated by the reference X4. Likewise, the device 6 is mounted oscillating around a second axis of rotation X6 parallel to the axis X4.

In this embodiment, the control member 4 is provided as a lever having a longitudinal axis Z4, which can be shifted by performing a rotary movement around the axis X4 between the various operative positions of the selector. Indicated for clarity of representation here are just the operative positions P and R, but the ensuing description applies in principle irrespective of the operative positions considered.

The control member 4 includes a stem 8 that is configured so that it comes out of the casing 2 and constitutes the interface with the driver of the vehicle, and a bushing 10 that houses the stem 8. Provided on the bushing 10 is the articulation via which the control member 4 is hinged around the axis X4. Moreover provided on the bushing 10 is a locking profile 12 for blocking the control member, the profile being configured for co-operating with the prevention device 6.

The locking profile 12 is represented in cross-sectional view in FIG. 1 and may be obtained, for example, by means of an element which extends between opposite sides set at a distance from one another of the bushing 10 and around which a housing is provided where the prevention device 6 is accommodated.

In greater detail, the locking profile 12 has a cross section identifying a crest 14 and an undercut 16, where the undercut 16 connects the crest 14 to the rest of the profile 12, which has a smaller width than the crest 14 itself.

The prevention device 6 includes a rocker 18 rotatably mounted around the axis X6. The rocker 18 can be driven in rotation around the axis X6 by means of an actuator member 20, in particular an electromagnetic actuator the moving element of which is connected to a pin 22 that engages within an eyelet on the rocker 18.

The pin 22 is axially movable along an axis Z20 between a retracted position, not illustrated in the figures and corresponding to a situation of energization of the solenoid of the electromagnet, and an extracted position, illustrated in FIGS. 1 to 4 and corresponding to a situation of absence of energization of the solenoid of the electromagnet. The retracted and extracted positions of the pin 20 determine, respectively, a resting position and a working position of the prevention device 6.

This means that all the figures illustrate the device 6 in the working position and the actuator member 6 in the non-energized condition (absence of activation). The resting position of the rocker 18 would simply correspond to a condition similar to that of FIG. 1, in which, however, the rocker 18 is rotated in a counterclockwise direction on account of retraction of the pin 22 along the axis Z20.

In greater detail, the rocker 18 includes a first portion 24 and a second portion 26 coupled to one another. The second portion 26 moreover includes a locking end 28 having a profile shaped substantially like a hook and configured for co-operating with the locking profile 12 of the control member 4.

The first portion 24 is connected to the actuator member 20 through the pin 22 and is moreover rotatable around the axis X6. The second portion 26 has the possibility of rotating around the axis X6 rigidly with the first portion 24, but is also capable of performing a movement of relative rotation around the axis X6 with respect to the portion 24, as will now be described.

The first portion 24 and the second portion 26 are coupled together by means of an articulated joint J that includes:
- a first hinge member and a second hinge member, which are provided, respectively, on the first portion 24 and on the second portion 26, where the first and second hinge members enable the rotation of the second portion 26 with respect to the first portion 24, as well as articulation of both with respect to the axis X6; and
- a coaxial elastic biasing member T that offers a resisting action in response to a torque applied thereon; in particular, in this embodiment, the elastic biasing member is coaxial to the axis X6 and offers a resisting action of resistance to a twisting moment directed along the axis X6.

In particular, in the embodiment illustrated in the figures, the elastic biasing member T is provided by means of a helical spring, which is set in such a way as to be coaxial to the axis X6 and surrounds the ensemble of the hinge members of the portions 24, 26. Moreover, the spring T includes a first free end T1 and a second free end T2 with wire-like geometry, which abut, respectively, upon the first and second portions 24, 26, for example in grooved seats provided thereon.

In alternative embodiments, albeit maintaining the same scheme of constraint of the free ends with respect to the portions 24, 26, the member T may take the form of a leaf spring with a V-shaped geometry, an L-shaped geometry, or also a rectilinear or slightly curved geometry. In this case, the mounting would no longer be coaxial to the axis X6 and surrounding the hinge members of the portions 24, 26.

Whatever the embodiment chosen, the spring T responds to torsion actions that modify the angular distance between the ends T1 and T2; i.e., it offers a resisting action to torsion actions imparted to the articulated joint J through the portions 24, 26.

Figure 2:
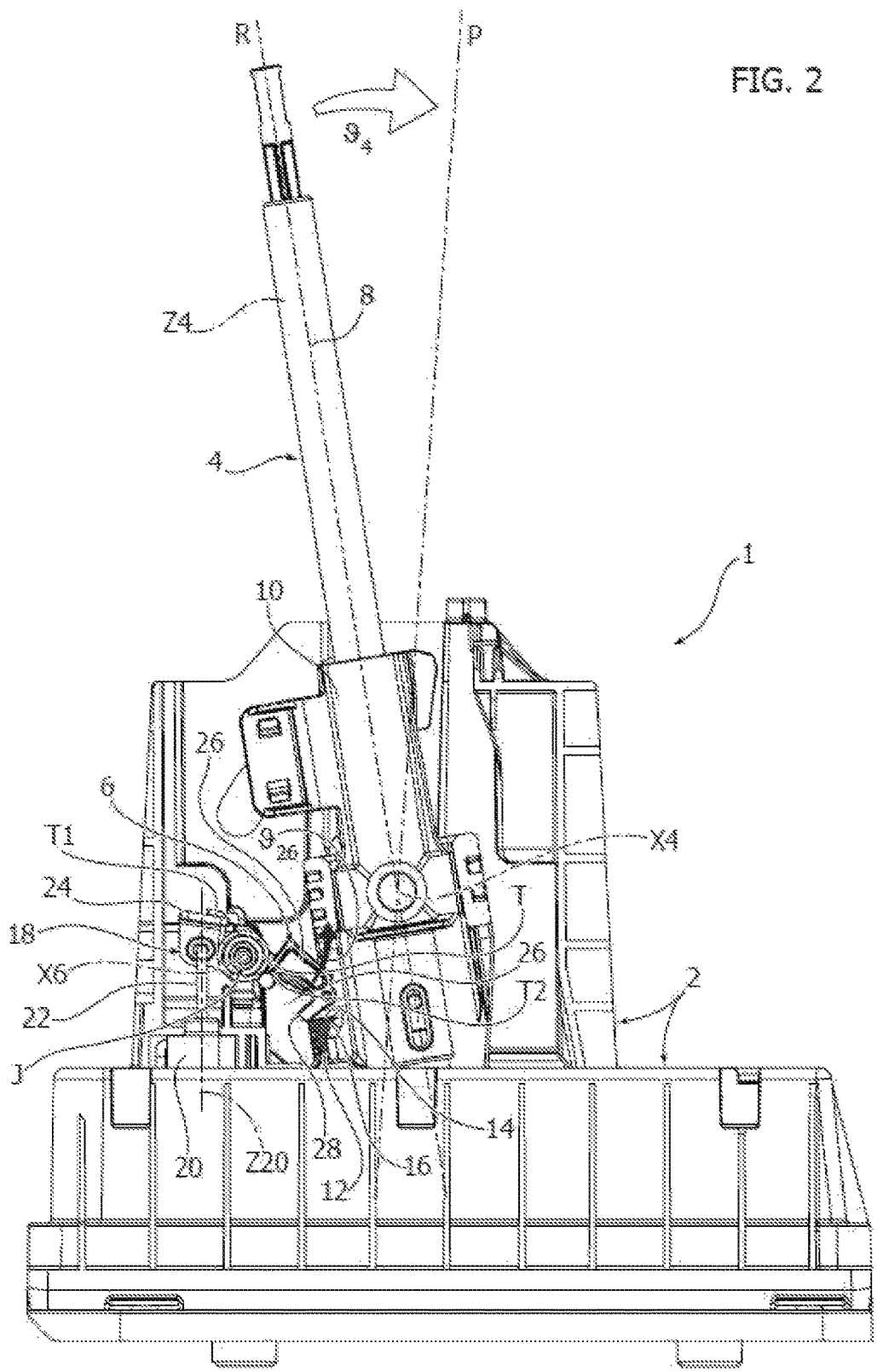
FIGS. 2 and 3 are views similar to that of FIG. 1 but referring to two intermediate conditions.
Figure 3:
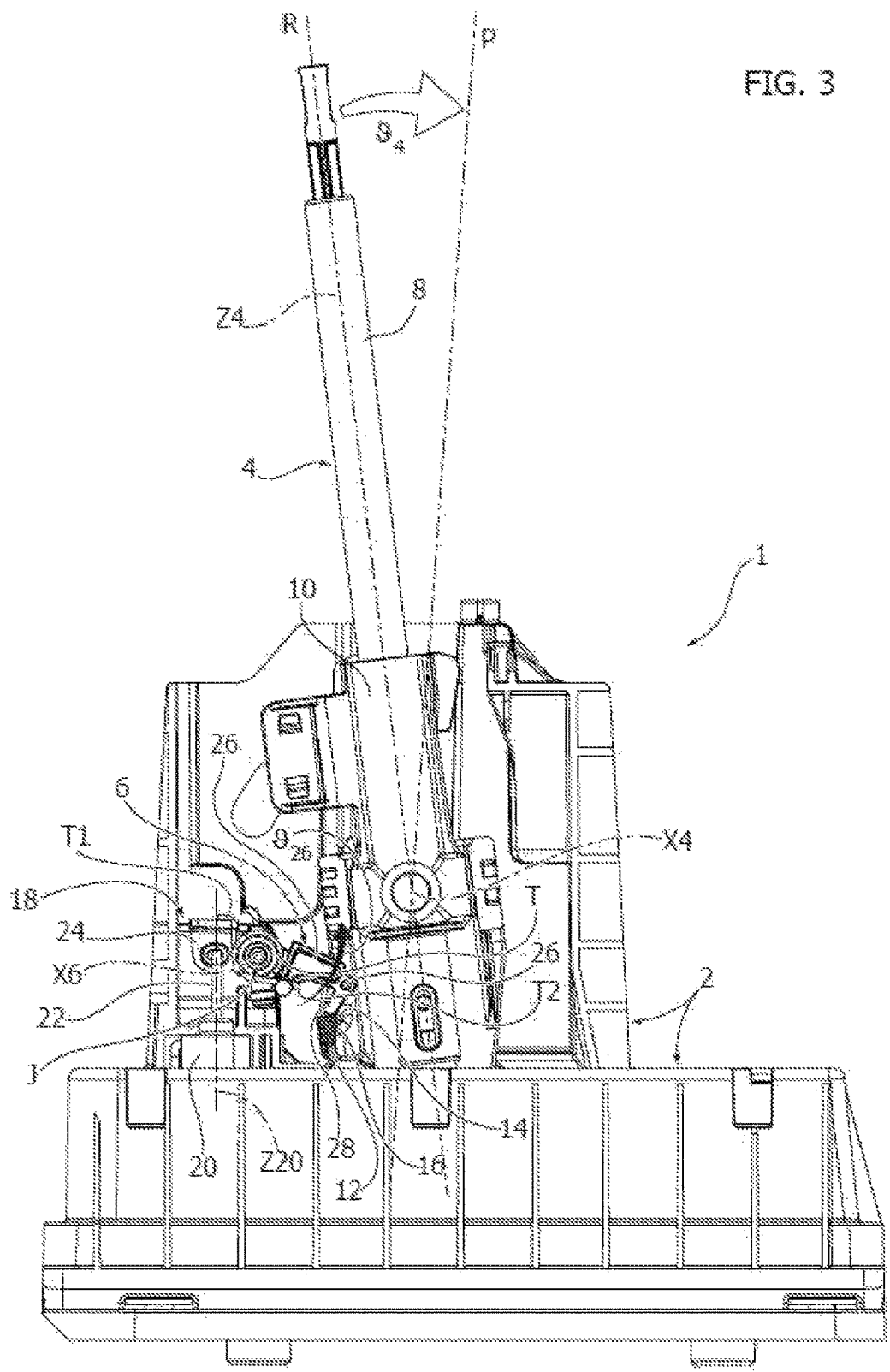

This enables the portions 24, 26 to assume a relative position that varies from the "undeformed" position of FIG. 1 to various "deformed" working positions illustrated in FIGS. 2 and 3, wherein a relative rotation between the portions 24 and 26 with respect to the condition of FIG. 1 has occurred.

It may moreover be noted that, in order to maintain the position of FIG. 1 in the absence of actions exerted on the member T, it is preferable to provide detent members on one and/or the other of the portions 24, 26 in such a way that these detent members bear upon one another (or in such a way that one detent member on one of the portions 24, 26 bears upon the other portion 26, 24). This, among other things, enables the spring T to be mounted with a given torsional (angular) preload.

Operation of the selector 1 is described in what follows.

With reference to FIG. 1, the position of the control member of the selector corresponds to a situation in which the reverse gear ratio is engaged.

The operative position of which selection is to be prevented (for the reasons referred to previously) is the parking position P: this position is identified by an axis line that corresponds to the position of the axis Z4 when the position P is selected.

The prevention action is achieved in the way illustrated in FIG. 1, i.e., with the actuator member 20 in conditions of non-activation (no current circulating in the solenoid) and with the pin 22 in the extracted position. In this way, the rocker 18 is in the respective working position, where the locking member 28 of the second portion 26 bears upon the locking profile 12, preventing rotation of the control member 4 in the clockwise direction (the direction is understood only with reference to the representation of the figures: in practice, actuation of the control member is, in general, in the direction of vehicle advance) and consequently preventing selection of the parking position P.

It should be noted that inhibition of selection of the parking position is rendered possible by the fact that the rocker 18 has the possibility of behaving like a rigid element when the action of actuation imparted on the control member 4 transmits to the second portion 26 an actuation force having a twisting moment around the axis X6 that is less than the value of torsional preload imparted on the spring T. In these conditions, the articulated joint J prevents relative movement of the portion 26 with respect to the portion 24 (which in any case is kept fixed thanks to the double constraint constituted by hinging around the axis X6 on one side and by the pin 22 on the other) and the rocker 18 behaves substantially as if were made of a single piece like the rocker element of the known prevention device described at the start of the present disclosure.

However, thanks to the selector according to the invention, and in particular to the articulated joint J, it is possible to enable selection of the (undesired) position P even when this selection is currently inhibited. The phrase "currently inhibited" is meant to indicate a circumstance such that both the position of the rocker in the "undeformed" configuration and the operating condition of the actuator member 20 create a situation in which it is possible to prevent selection of the undesired position (P in this case).

This need, as has been mentioned, may present in the event of given emergency situations, in which arrest of the vehicle is possible only by activating the parking block.

In these conditions, it is reasonable to assume that the action of actuation applied on the control member 4 by the driver will have values that are higher than those that can be encountered in the event a normal actuation, precisely on account of the emergency circumstances. This implies transmission of a force from the locking profile 12 to the second portion 26, which now generates a twisting moment around the axis X6 greater than the threshold value defined by the torsional preload of the spring T. In this connection, sizing of the spring T and the value of the elastic preload imparted thereon are obtained according to what is deemed to be the intensity of an action of actuation exerted in conditions of emergency, taking into account also the geometry in the area of interface between the profile 12 and the element 28 (which may affect to a certain extent the direction of the resultant of the forces exchanged and consequently the twisting moment around the axis X6).

The condition of start of the aforementioned emergency manoeuvre is represented in FIG. 2, visible in which is the control member 4 imparted on which is a rotation in the direction $\theta_4$ (in this case the clockwise direction), which is logically transferred also to the locking profile 12. In this way, the profile 12 is forced against the portion 26 of the rocker 18.

In these conditions, when the force of actuation applied on the control member 4 results in the transmission of a force from the locking profile 12 to the second portion 26, which generates a twisting moment around the axis X6 higher than the threshold value defined by the torsional preload of the spring T, the joint J between the portions 24, 26—so to speak—"opens" assuming the behaviour of a hinge (even though there remains an action of elastic biasing exerted by the elastic member T). This enables rotation in a counterclockwise direction $\theta_{26}$ of the second portion 26 relative to the first portion 24 as illustrated in FIG. 2.

As has been mentioned, the above rotation is in any case countered by the elastic member T, in so far as the end T2 is driven in rotation around the axis X6 by means of a contrast member that is integral with (or otherwise fixed to) the portion 26, whereas the end T1 remains fixed in contact with the contrast member on the portion 24, which does not change its position.

The result of this is a relative sliding between the locking profile 12 and the locking member 28, given that the change of the geometrical configuration of the rocker 18 enables the two parts in question to pass over one another.

The above condition, corresponding to the continuation of the manoeuvre started in FIG. 2, is shown in FIG. 3, where it may be noted how rotation $\theta_4$ of the control member 4 has led the latter into a position much closer to the parking position P and has consequently displaced the locking profile 12 with respect to the rocker 18 into a position such that there exists a relative sliding between the locking member 28 and the profile 12 along the crest 14.

This is rendered possible by an even more accentuated rotation $\theta_{26}$ of the portion 26 with respect to the portion 24, which hence defines a configuration of the rocker 18 markedly deviated from the undeformed condition: this enables the control member 4 to override the block created by the second portion 26, thus enabling selection of the undesired operative position P that is currently inhibited.

It should be noted that the surface of the crest 14 and the corresponding surface of contact on the locking member 28 must be shaped so as to prevent any sticking of the mechanism during the manoeuvre due to friction phenomena, which might not be overcome just with the deformability of the elastic member T.

Figure 4:
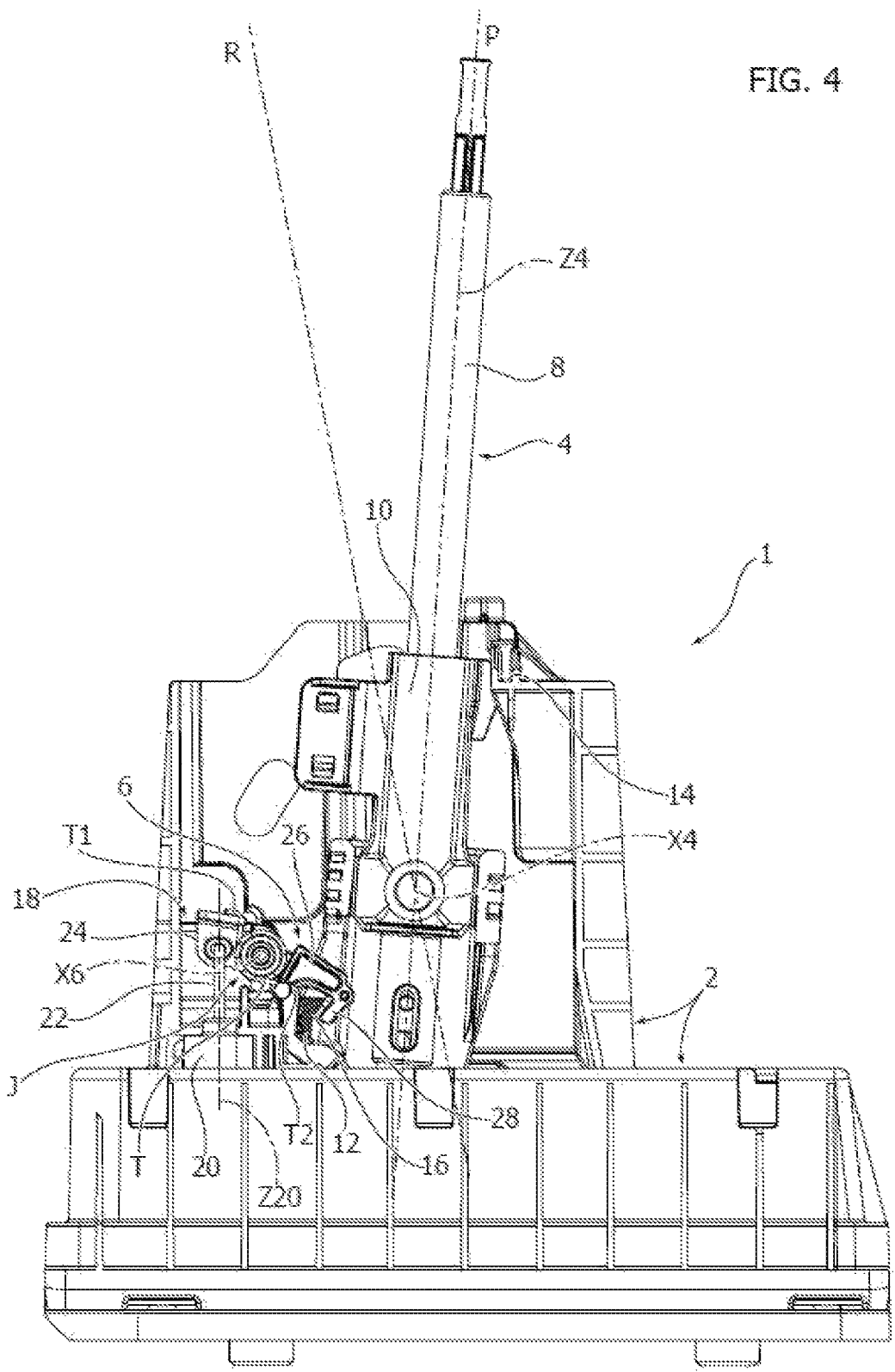
FIG. 4 is a view similar to those of the previous figures but referring to a final condition of the manoeuvre, in which the undesired operative position has been in any case selected.

FIG. 4 shows the end of the emergency manoeuvre in question: the control member 4 occupies the operative position P that corresponds to the condition of parking block engaged.

The rocker 18 has returned into its undeformed configuration already illustrated in FIG. 1, but now—as a result of the movement of the profile 12—the portion 26 is set astride of the profile 12 itself, with the locking member 28 facing the undercut 16.

Preferably, the rocker 18 is sized and positioned in such a way that in the position of FIG. 4 in any case a slight clearance between the portion 26 and the locking profile 12 exists, which favours proper operation of the mechanism. This can be obtained, for example, with the positioning of the detents that define the undeformed condition of the rocker 18 and/or via a choice of the geometry of the rocker itself.

The shape of the undercut 16 and the substantially hook-like shape of the locking member 28 are such that it is not immediately possible to shift the control member 4 from the parking position P to the reverse position R: the contrast between the contact surfaces of the member 28 and the undercut 16 prevents disengagement of the locking profile 12 from the rocker 18. It should be noted that disengagement is not even possible by exploiting the joint J, in so far as this would require a rotation in a counterclockwise direction of the portion 26 with respect to the portion 24, which is not possible to obtain on account of the detents that define the resting position of the rocker 18 (in addition to the fact that, preferably, the contact surfaces of the member 28 and of the undercut 16 are shaped so as to strengthen the contact as the intensity of the disengagement action increases).

The only intervention that enables release of the selector 1 from the condition of FIG. 4 is consequently an actuation of the actuator member 20 (energization of the electromagnet) that will cause retraction of the pin 22 and counterclockwise rotation of the entire rocker 18, which releases the locking profile 12.

The person skilled in the art will appreciate that, albeit maintaining all the functions common to prevention devices of a known type, i.e., those of preventing selection of the parking position when this is undesired and/or dangerous, as well as maintaining the parking position once it has been selected, the selector 1 equipped with the prevention device 6 according to the invention enables the driver to conclude an emergency manoeuvre that otherwise would be rendered impossible.

Not only that: in the absence of electric power supply to the circuit that governs the actuator member 20, the driver has in any case the possibility of selecting the parking position in so far as no electrical activation of the actuator 20 is necessary to get the control member 4 to override the block. The above, as extensively described, occurs in a completely mechanical way thanks to the articulated joint J.

Moreover, the selector 1 is also intrinsically safer in terms of preservation of the integrity of the transmission members: if the driver carries out a manoeuvre (as a result of an emergency or of misuse) that is potentially dangerous for the transmission, such as engagement of the parking block while the vehicle is travelling via selection of the position P, thanks to the prevention device 6 the driver receives first of all a perceivable feedback as to the wrongness of the manoeuvre that consists in sticking of the control member 4.

If this were not sufficient to stop the driver from selecting in any case the parking position P currently inhibited, selection of the latter position would require in any case a certain lapse of time for its completion, since it is necessary that all the sequence of events described with particular reference to FIGS. 2 to 4 occurs. In this lapse of time, as may be noted, the speed of the vehicle decreases to the advantage of safety and integrity of the transmission: lower speeds at the time of completion of selection of the position P are equivalent to impulsive phenomena of a lesser degree acting on the transmission members, with transmitted forces having a much more limited intensity.

Nevertheless, it should be noted that the possibility of mechanically overriding the block created by the rocker 18 is effective even in the case where the manoeuvre of selection of the position P occurs which are in conditions per se correct, but in times so short as not to allow completion of displacement of the rocker 18 by the actuator member 20. Thanks to the device 6, selection of the parking position P is in any case possible with the modalities described in relation to FIGS. 2, 3, and 4.

Of course, even though the prevention device 6 has been herein illustrated in the specific context of prevention of selection of a parking position of the selector 1, the same prevention action can be exerted in respect of any operative position of the selector 1 that is deemed undesirable in given operating conditions.

For this reason, the bushing 10 may, in some alternative embodiments, be provided with a plurality of locking profiles similar to the locking profile 12, set in a staggered position with respect thereto, and configured for engaging with as many devices 6, which are able to implement the same (or an alternative) logic of selective prevention, as specified in the present description.

As regards the rocker 18, variants are possible wherein the portions 24 and 26 are articulated to one another with respect to a third axis, parallel to the axes X4 and X6 (which are parallel to one another). In this case, the axis X6 enables articulation of the portion 24 with respect to the casing 2, whereas the third axis enables articulation between the portions 24 and 26. The joint J would be in this case mounted around the third axis and not around the axis X6.

Of course, the details of construction and the embodiments may vary widely with respect to what has been described and illustrated herein, without thereby departing from the scope of the present invention, as defined in the annexed claims.

What is claimed is:

1. A selector for an automatically operated gearbox, the selector comprising:
    a casing,
    a control member mounted within said casing in an oscillating manner around a first axis of rotation, the control member being movable to or through a plurality of operative positions, including to a park position, associated to respective operating conditions of the gearbox via a first amount of actuation force applied to the control member,
    a prevention device of the selection of an undesired operative position of said selector when an associated vehicle is under certain operating conditions, the undesired operative position being the park position,
    wherein the prevention device includes a rocker mounted within said casing in a rotatable manner around a second axis of rotation, said rocker being operable in rotation around said second axis of rotation by an actuator member between a resting position and a working position in which it is configured to inhibit the selection of the undesired operative position,
    wherein said rocker includes a first portion and a second portion, wherein the first portion is connected to the actuator member and wherein, in the working position of the rocker, the second portion is configured to block said control member upon an occurrence of a selection maneuver of said undesired operative position, when the control member is subjected to a force on the order of the first amount of actuation force, so as to inhibit the selection thereof, and
    wherein the first portion and the second portion are connected to one another by an articulated joint, the articulated joint configured to i) prohibit relative rotation between the first portion and the second portion around the second axis of rotation when subjected to the force on the order of the first amount of actuation force, and ii) enable a rotation of said second portion relative to said first portion upon exceeding of a predetermined value of a second amount of actuation force, greater than the first amount of actuation force, being applied to said control member during said selection maneuver of said undesired operative position with the rocker being in the working position,
    thereby allowing said control member to override a block provided by the second portion, and accordingly enable the selection of said undesired operative position currently inhibited in an absence of electrical power supply to the actuator member and without activation of the actuator member.

2. The selector according to claim 1, wherein said first axis of rotation and said second axis of rotation are parallel to one another.

3. The selector according to claim 1, wherein the first portion and the second portion of said rocker are articulated to one another around said second axis of rotation.

4. The selector according to claim 1, wherein said articulated joint includes a first hinge member and a second hinge member provided on said first portion and second portion respectively, and an elastic biasing member configured to provide a resistance action with respect to torsion actions imparted to said articulated joint.

5. The selector according to claim 4, wherein said elastic biasing member is a spring including a first free end in abutment on said first portion and a second free end in abutment on said second portion.

6. The selector according to claim 4, wherein the second portion of the rocker includes an end having a locking member shaped substantially as a hook.

7. The selector according to claim 6, wherein said control member includes a locking profile configured to cooperate with said locking member of said second portion of the rocker.

8. The selector according to claim 7, wherein said locking profile includes a crest and an undercut, wherein:
    said crest is slidable relative to said locking member of the second portion of the rocker upon the occurrence of the overriding of the block provided by the second portion, and
    said locking member is configured to cooperate with said undercut to prevent a further selection maneuver which is subsequent and in opposite direction with respect to said selection maneuver of said undesired operative position.

9. The selector according to claim 1, wherein said actuator member includes an electromagnet configured for controlling a pin connected to the first portion of said rocker.

* * * * *